United States Patent
Shin

(10) Patent No.: US 12,273,790 B2
(45) Date of Patent: Apr. 8, 2025

(54) SHARING STATE BASED ON DIRECTIONAL PROFILES

(71) Applicant: GOOGLE LLC, Mountain View, CA (US)

(72) Inventor: Dongeek Shin, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 350 days.

(21) Appl. No.: 17/813,824

(22) Filed: Jul. 20, 2022

(65) Prior Publication Data
US 2024/0031773 A1 Jan. 25, 2024

(51) Int. Cl.
*H04W 4/029* (2018.01)
*H04W 4/02* (2018.01)

(52) U.S. Cl.
CPC ........... *H04W 4/029* (2018.02); *H04W 4/026* (2013.01); *H04W 4/027* (2013.01)

(58) Field of Classification Search
CPC ...... H04W 4/029; H04W 4/026; H04W 4/027
See application file for complete search history.

(56) References Cited

U.S. PATENT DOCUMENTS

| 9,191,773 B2 | 11/2015 | Fry |
| 2020/0382647 A1* | 12/2020 | Krochmal ......... H04M 3/42263 |
| 2021/0140787 A1 | 5/2021 | Zilberman et al. |

FOREIGN PATENT DOCUMENTS

| EP | 3116144 A1 | 1/2017 |
| WO | 2015065494 A1 | 5/2015 |

OTHER PUBLICATIONS

"Elbow Method (clustering)", Wikipedia (https://en.wikipedia.org/w/index.php?title=Elbow_method_(clustering)&oldid=1084830665), Apr. 26, 2022, 2 pages.
International Search Report and Written Opinion for PCT Application No. PCT/US2023/070131, mailed on Oct. 9, 2023, 13 pages.

* cited by examiner

*Primary Examiner* — Kevin Kim
(74) *Attorney, Agent, or Firm* — Brake Hughes Bellermann LLP

(57) ABSTRACT

A method can include determining, by a correlation device, that a correlation event has occurred based on at least a first device and a second device having corresponding directional profiles, and responsive to occurrence of the correlation event, causing the first device to transfer a state of the first device by sending a state information message to the second device.

20 Claims, 12 Drawing Sheets

SHARING STATE BASED ON DIRECTIONAL PROFILES

BACKGROUND

Users can access information via multiple electronic devices. At times, users may wish to switch electronic devices while continuing to access the same information.

SUMMARY

Implementations relate to sharing of information between devices based on correlations in inertial movements of the devices. For example, a user may desire to share content, and/or a state of an application, between different electronic devices. While such sharing can be done manually, this typically requires use of multiple interfaces and can be cumbersome. Implementations provide a technique for using corresponding inertial movements of multiple devices over time (e.g., a time window) for triggering transfer of an application state/content. For example, the user may be carrying electronic devices while walking or riding in a vehicle. Implementations generate directional profiles for the electronic devices and, when the profiles correlate, trigger state sharing between the devices. A technical problem with sharing a state between electronic devices based on proximity of location is that determination of location, at a high level of specificity, can be a slow process. A technical solution to the technical problem of slow determination of location is to share a state between electronic devices based on directional profiles of the electronic devices. The directional profiles can be based on accelerometer movements, which can be measured and shared quickly between electronic devices. A technical benefit of sharing the state based on directional profiles of the electronic devices is that the correspondence of directional profiles can be determined quickly, allowing the states to be shared between electronic devices with low latency.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Electronic devices can generate directional profiles and, when the directional profiles correspond (correlate), indicating that a user or users are carrying or otherwise traveling with the electronic devices together, share a state or state information, thereby synchronizing and/or transferring content between the electronic devices. The state information can include a state of a web browser or a game. The sharing of the state information can enable the user or users to seamlessly transition from interacting from one electronic device to another. A directional profile of a device can be a sequence of records over time, each record including values that carry information about a device's position and/or orientation. A directional profile of a device is usable to track the movement of the device over time.

Figure 1A:
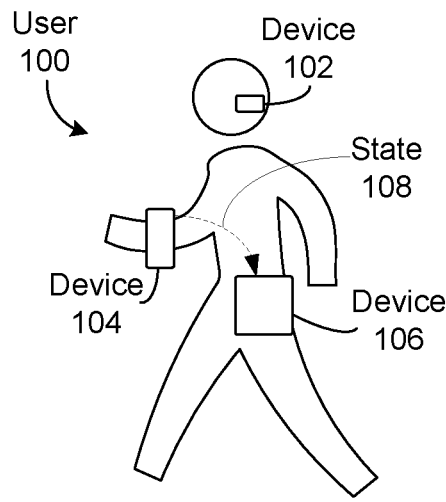
FIG. 1A shows a first user walking with a first electronic device, a second electronic device, and a third electronic device.

FIG. 1A shows a first user 100 walking with a first electronic device 102, a second electronic device 104, and a third electronic device 106. The user 100 can carry the electronic devices 102, 104, 106. One of the electronic devices 102, 104, 106, such as the electronic device 104, can transfer content and/or share a state 108, within one or more of the other electronic devices 102, 104, 106, such as the electronic device 106. The user 100 can carry one or more of the electronic devices 102, 104, 106 in the user's 100 hand. The user 100 can carry one or more of the electronic devices 102, 104, 106 by attaching the electronic devices 102, 104, 106 to the user's 100 body, e.g., by straps, inserting in-ear, or carrying in a bag, backpack, etc., as non-limiting examples. In the example shown in FIG. 1A, the first electronic device 102 can include a smartphone or an earbud. In the example shown in FIG. 1A, the second electronic device 104 can include a smartwatch or a smartphone. In the example shown in FIG. 1A, the third electronic device 106 can include a tablet computing device. The first electronic device 102, the second electronic device 104, and the third electronic device 106 can be associated with the user 100 and/or an account owned or managed by the user. When the user 100 is carrying the three electronic devices 102, 104, 106, the inertial movements and/or acceleration of the three electronic devices 102, 104, 106, measured by accelerometers and/or inertial measurement units (IMUs) (that can each include one or more accelerometers) included in the electronic devices 102, 104, 106, will be similar, e.g., will correspond. Inertial movements and/or acceleration data are readily available, enabling one or more of the electronic devices 102, 104, 106 to quickly determine proximity of the other electronic devices 102, 104, 106.

Figure 1B:
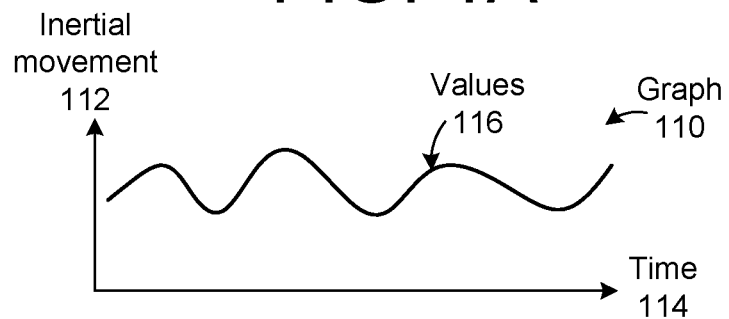
FIG. 1B is a graph showing inertial movement as a function of time for the first electronic device carried by the first user in the example of FIG. 1A.

FIG. 1B is a graph 110 showing inertial movement 112 as a function of time 114 for the first electronic device 102 carried by the first user 100 in the example of FIG. 1A. In some examples, the inertial movement values 116 can be obtained from an inertial movement unit (IMU) in the first electronic device 102. The inertial movement values 116 can be a principal component of a three-axis reading, e.g., (x, y, z) acceleration. Accelerometer and/or IMU measurements, represented by inertial movement values 116, could be measured and/or stored at a sampling rate, e.g., a sampling rate of, for example, one hundred Hertz (100 Hz). Thus, the inertial movement values 116 represent measurements taken over some duration of time. The first electronic device 102 could, for example, perform dimensionality reduction such as principal component analysis (PCA) and/or singular value decomposition (SVD) on the three dimensional measurements outputted by an accelerometer included in the first electronic device 102. The inertial movement values 116 can be the first principal component resulting from the principal component analysis, and/or a most important dimension resulting from the dimensionality reduction. In some implementations, the inertial movement values 116 may be an embedding of the three dimensional measures outputted by an accelerometer in the first electronic device 102.

Figure 1C:
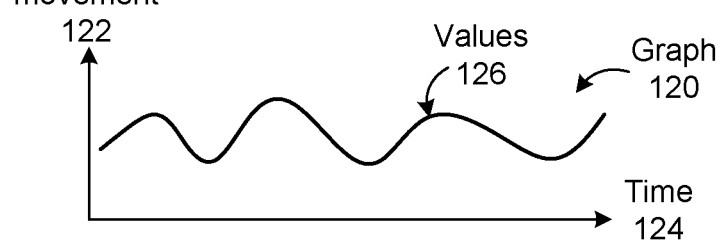
FIG. 1C is a graph showing inertial movement as a function of time for the second electronic device carried by the first user in the example of FIG. 1A.

FIG. 1C is a graph 120 showing inertial movement 122 as a function of time 124 (e.g., a time duration) for the second electronic device 104 carried by the first user 100 in the example of FIG. 1A. The inertial movement values 126 are generated in a similar manner as the inertial movement values 116 so that a correlation process can be performed. For example, the inertial movement values 126 can be a principal component of a three-axis accelerometer reading. The second electronic device 104 could, for example, perform dimensionality reduction such as principal component analysis (PCA) on the three dimensional measurements outputted by an accelerometer included in the second electronic device 104, similar to the first electronic device 102. The inertial movement values 126 can be the principal component resulting from the principal component analysis.

Figure 1D:
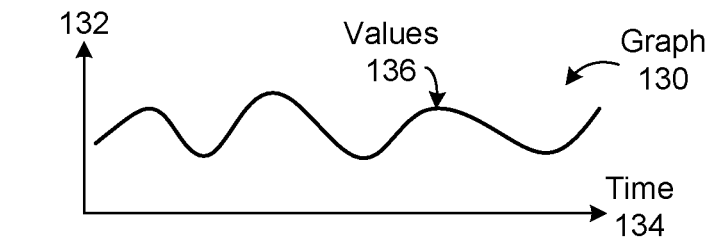
FIG. 1D is a graph showing inertial movement as a function of time for the third electronic device carried by the first user in the example of FIG. 1A.

FIG. 1D is a graph 130 showing inertial movement 132 as a function of time 134 for the third electronic device 106 carried by the first user 100 in the example of FIG. 1A. The inertial movement values 136 are generated in a similar manner as the inertial movement values 116 and 126 so that a correlation process can be performed. For example, the inertial movement values 136 can be a principal component of a three-axis accelerometer reading. The third electronic device 106 could, for example, perform dimensionality reduction such as principal component analysis (PCA) on the three dimensional measurements outputted by an accelerometer included in the third electronic device 106. The inertial movement values 136 can be the principal component resulting from the principal component analysis.

The inertial movement as functions of time shown in FIGS. 1B, 1C, and 1D can be considered directional profiles. The directional profiles can be based on directions of movement and/or inertial movement data measured by the electronic devices 102, 104, 106. The respective directional profiles can indicate directions of movement of the respective electronic devices 102, 104, 106. The inertial movement values 116, 126, 136 shown in FIGS. 1B, 1C, and 1D (as well as the values 216, 226, 236, 316, 326 shown in FIGS. 2B, 2C, 2D, 3B, and 3C) can be considered abstractions of the accelerometer data measured by the respective electronic devices 102, 104, 106, 302, 306. In examples in which dimensionality reduction, such as PCA, was performed on the accelerometer and/or IMU values measured by the electronic devices 102, 104, 106, 302, 306 and the horizontal movement and/or acceleration in a single direction was generally constant because the user was moving at a constant velocity, the values 116, 126, 136, 216, 226, 236, 316, 326 can represent vertical movement and/or acceleration. In some implementations, the inertial movement values 116, 126, 136 shown in FIGS. 1B, 1C, and 1D (as well as the values 216, 226, 236, 316, 326 shown in FIGS. 2B, 2C, 2D, 3B, and 3C) can represent embeddings, or multiple vectors for each sampling from an IMU, e.g., so there are multiple data points at each sample (measurement) represented in the time duration.

The similar (or correlated) directional profiles of the electronic devices 102, 104, 106 can indicate that they are being carried by the user. In some examples, an electronic device, such as one of the electronic devices 102, 104, 106 or a remote electronic device, can perform a clustering function to determine which, if any, of the electronic devices 102, 104, 106 have corresponding directional profiles. In some examples, electronic devices 102, 104, 106 that are in a same and/or primary cluster can be considered to have corresponding directional profiles. In some examples, electronic devices 102, 104, 106 that are in a same cluster and have non-zero or significant movement and/or acceleration (indicating that they were not stationary) can be considered to have corresponding directional profiles. In the example of FIGS. 1A, 1B, 1C, and 1D, all three of the electronic devices 102, 104, 106 can be considered to have corresponding, matching, or correlated, directional profiles. Other electronic devices, not shown, can have directional profiles that are not in the same cluster as the directional profiles of the electronic devices 102, 104, 106, and can be considered to not have corresponding directional profiles with any of the electronic devices 102, 104, 106.

In some examples, the directional profiles of the electronic devices 102, 104, 106 can be considered to correspond or match (correlate) if their inertial movement as functions of time satisfy a similarity threshold. The similarity threshold can require a sum of differences between inertial movement values (or principal components) at each point in time to be at or below a difference threshold, or a sum of squared differences between inertial movement values (or principal components) at each point in time to be at or below a squared difference threshold, or the sum of differences or sum of squared differences to be at or below a predetermined fraction of an average of the inertial movement values, as non-limiting examples. In some examples, one or more of the electronic devices 102, 104, 106 can shift the time values to find a maximum fit or maximum match, to account for differences in time measurements between the electronic devices 102, 104, 106.

Figure 2A:
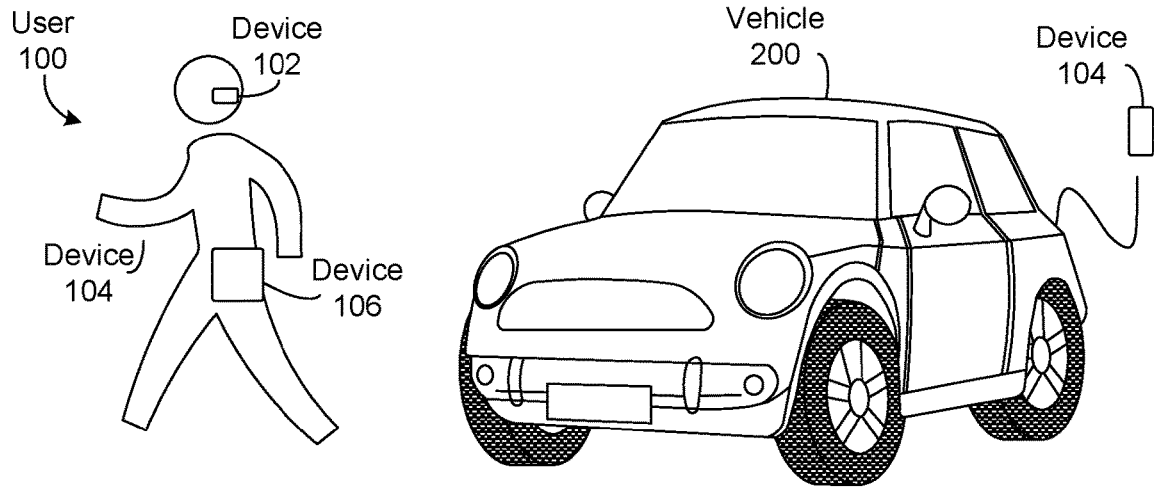
FIG. 2A shows the first user walking with the first electronic device and the third electronic device, and leaving the second electronic device in a vehicle.

FIG. 2A shows the first user 100 walking with the first electronic device 102 and the third electronic device 106, and leaving the second electronic device 104 in a vehicle 200.

Figure 2B:
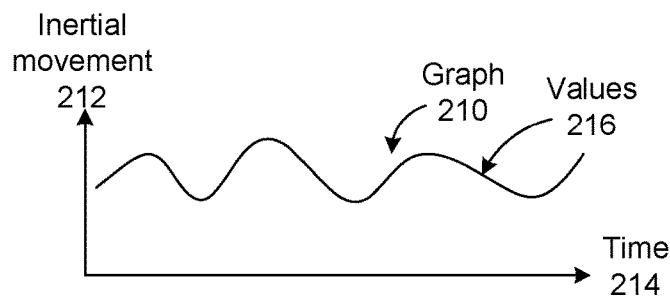
FIG. 2B is a graph showing inertial movement as a function of time for the first electronic device carried by the first user in the example of FIG. 2A.

FIG. 2B is a graph 210 showing inertial movement 212 as a function of time 214 for the first electronic device 102 carried by the first user 100 in the example of FIG. 2A. The first electronic device 102 can determine the inertial movement 212 in a similar manner as described above with respect to FIGS. 1B, 1C, and 1D.

Figure 2C:
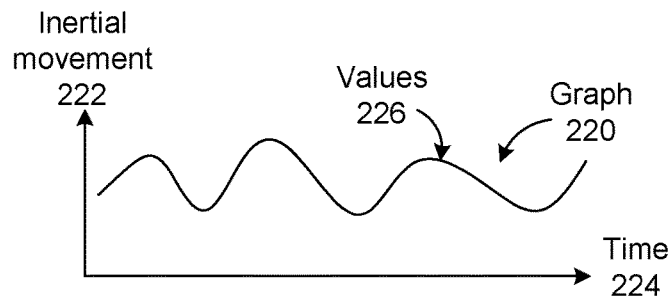
FIG. 2C is a graph showing inertial movement as a function of time for the third electronic device carried by the first user in the example of FIG. 2A.

FIG. 2C is a graph 220 showing inertial movement 222 as a function 224 of time for the third electronic device 106 carried by the first user 100 in the example of FIG. 2A. The third electronic device 102 can determine the inertial movement 222 in a similar manner as described above with respect to FIGS. 1B, 1C, and 1D.

Figure 2D:
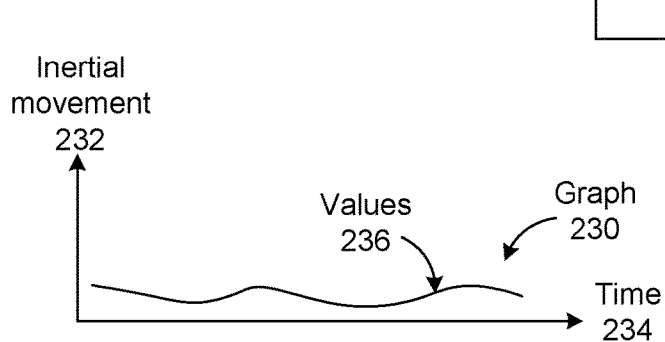
FIG. 2D is a graph showing inertial movement as a function of time for the second electronic device left in the vehicle by the first user in the example of FIG. 2A.

FIG. 2D is a graph 230 showing inertial movement 232 as a function of time 234 for the second electronic device 104 left in the vehicle 200 by the first user 100 in the example of FIG. 2A. The second electronic device 104 can determine the inertial movement 232 in a similar manner as described above with respect to FIGS. 1B, 1C, and 1D. The inertial movement 232 of the second electronic device 104 left in the vehicle 200 is lower, and/or has less variation, than the inertial movement 212 of the first electronic device 102 or the inertial movement 222 of the third electronic device 106 carried by the first user 100 while walking, either because the vehicle 200 is stationary or because the movement patterns of the vehicle 200 while driving result in less inertial movement.

The electronic devices 102, 104, 106 can determine respective directional profiles based on their respective inertial movements 212, 222, 232 as described above. In the example of FIGS. 2A, 2B, 2C, and 2D, the first electronic device 102 and third electronic device 106, which are carried by the first user 100, have corresponding directional profiles. In the example of FIGS. 2A, 2B, 2C, and 2D, the directional profile of the second electronic device 104 does not match and/or correspond to the directional profile of either the first electronic device 102 or the third electronic device 106.

Figure 3A:
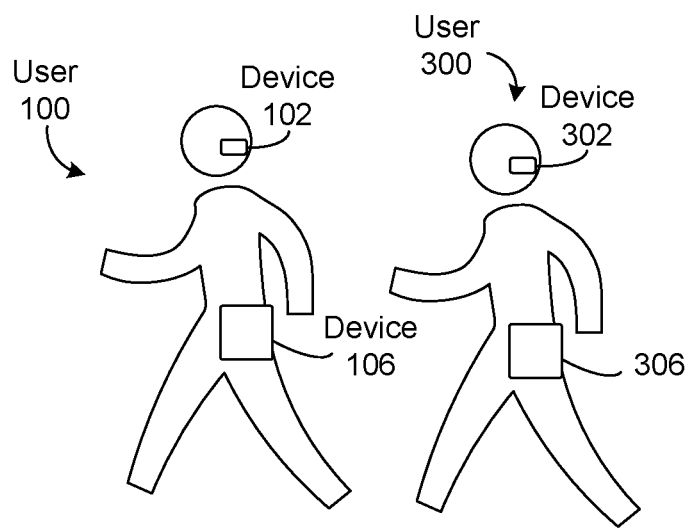
FIG. 3A shows the first user walking with the first electronic device and the third electronic device, and a second user walking with a fourth electronic device and a fifth electronic device.

FIG. 3A shows the first user 100 walking with the first electronic device 102 and the third electronic device 106, and a second user 300 walking with a fourth electronic device 302 and a fifth electronic device 306. The first user 100 and the second user 300 are walking together, at a similar pace, using a same mode of transportation (walking). This example can also apply when multiple users are using another, same mode of transportation, such as riding in a vehicle together. The first and third electronic devices 102, 106 can be associated with the first user 100 and/or an account owned and/or managed by the first user 100. The fourth and fifth electronic devices 302, 306 can be associated with the second user 300 and/or an account owned by and/or managed by the second user 300. The first user 100 and the second user 300 can be included in a group, and/or the first electronic device 102, third electronic device 106, fourth electronic device 302, and fifth electronic device 306 can be included in a group. A group can include a group within a social network, a productivity application, or a gaming application, as non-limiting examples. The users 100, 300 may have opted to join the group and share the states of their respective electronic devices 101, 106, 302, 306 with other members of the group. The group, which can include users 100, 300 may have been created by one of the users 100, 300, or by another member of the group, and members may have opted in to share the states of their respective electronic devices 102, 106, 302, 306 with other members of the group.

Figure 3B:
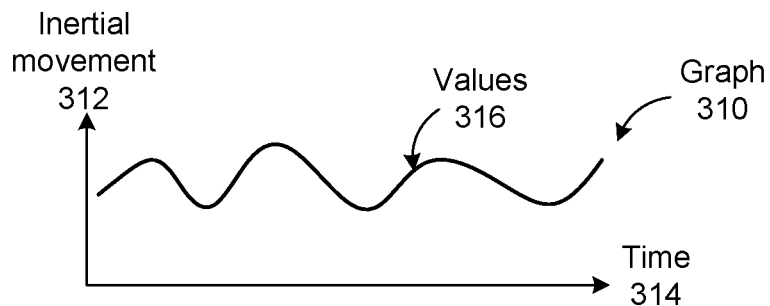
FIG. 3B is a graph showing inertial movement as a function of time for the third electronic device carried by the first user in the example of FIG. 3A.

FIG. 3B is a graph 310 showing inertial movement 312 as a function of time 314 for the third electronic device 106 carried by the first user 100 in the example of FIG. 3A. The third electronic device 102 can determine the inertial movement 312 in a similar manner as described above with respect to FIGS. 1B, 1C, and 1D.

Figure 3C:
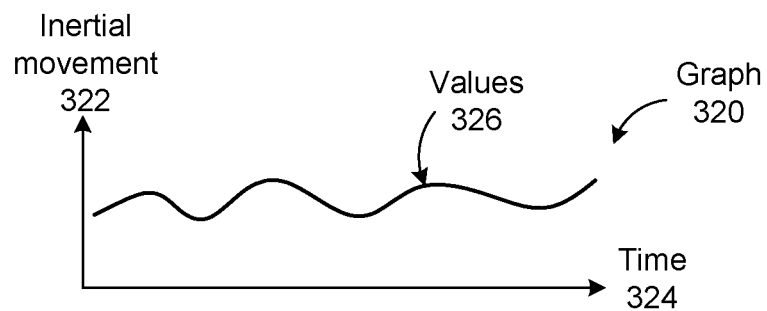
FIG. 3C is a graph showing inertial movement as a function of time for the fifth electronic device carried by the second user in the example of FIG. 3A.

FIG. 3C is a graph 320 showing inertial movement 322 as a function of time 324 for the fifth electronic device 306 carried by the second user 300 in the example of FIG. 3A. The fifth electronic device 306 can determine the inertial movement 322 in a similar manner as described above with respect to FIGS. 1B, 1C, and 1D.

The electronic devices 102, 106, 302, 306 can determine respective directional profiles based on their respective inertial movements 312, 322 as described above. In the example of FIGS. 3A, 3B, and 3C, the third electronic device 106 and fifth electronic device 306, which are carried by the first user 100 and second user 300, respectively have corresponding directional profiles. In some examples, the electronic devices 106, 306 can be considered to have corresponding directional profiles based at least in part on movements tracked by accelerometers and/or IMUs included in the respective electronic devices 106, 306 indicating that the electronic devices 106 have similar or same modes of transportation, such as both of the electronic devices 106, 306 being transported by a vehicle (bike, car, truck, ATV, snowmobile, etc.) or both of the electronic devices 106, 306 being transported by pedestrians.

Figure 4A:
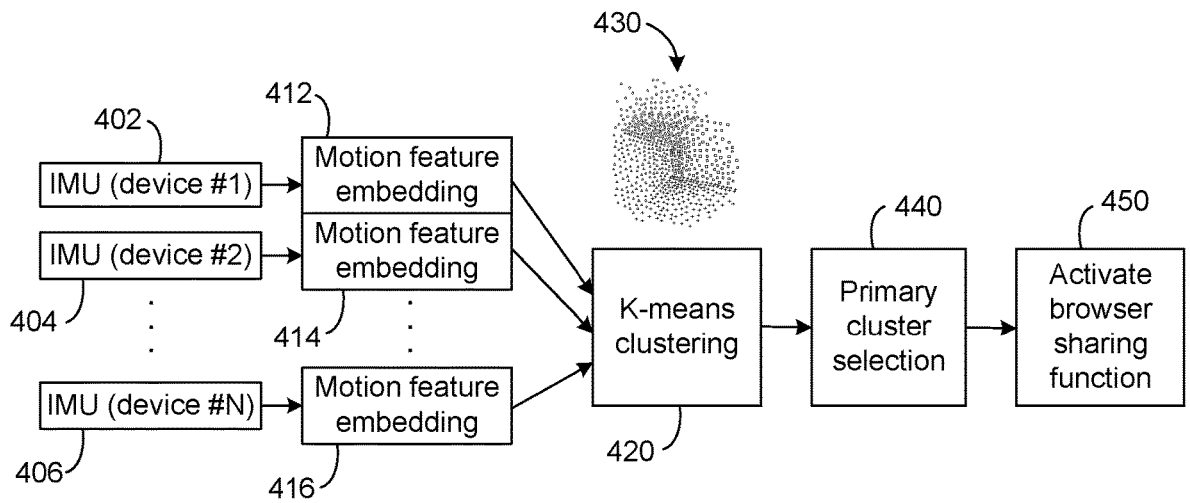
FIG. 4A shows an example processing flow for sharing a state of an electronic device based on corresponding directional profiles.

FIG. 4A shows an example processing flow for sharing a state of an electronic device based on corresponding directional profiles. Multiple electronic devices, which can each include an inertial measurement unit (IMU) 402, 404, 406 and/or accelerometer, can measure acceleration of the respective electronic device. The respective electronic devices can perform motion feature embedding 412, 414, 416 on the acceleration measurements performed by their respective IMUs 402, 404, 406. The motion feature embedding 412, 414, 416 can generate a directional profile for the respective electronic devices, such as by dimensionality reduction such as performing principal component analysis (PCA) on three dimensional measurements outputted by the IMU 402, 404, 406 included in the respective electronic device.

One or more of the electronic devices can receive the directional profiles from the other electronic devices and perform clustering (420) on the directional profiles. In some examples, the electronic device can perform K-means clustering on the directional profiles. The clustering (420) can determine which electronic devices have similar and/or corresponding directional profiles. An example set of data points 430 is shown in FIG. 4A, with four distinct clusters.

In some examples, the clustering (420) can include performing the elbow method of clustering to determine the number of clusters. The elbow method can include plotting variation as a function of the number of clusters (K), and picking the elbow of the curve (or knee of the curve) as the number of clusters.

After performing the clustering (420), the electronic device that performed the clustering can select a primary cluster (440). The primary cluster can be the cluster with the largest number of electronic devices.

The electronic devices within the primary cluster can be considered to have corresponding directional profiles. One or more of the electronic devices that have corresponding directional profiles can activate a sharing function (450), such as a browser sharing function.

Figure 4B:
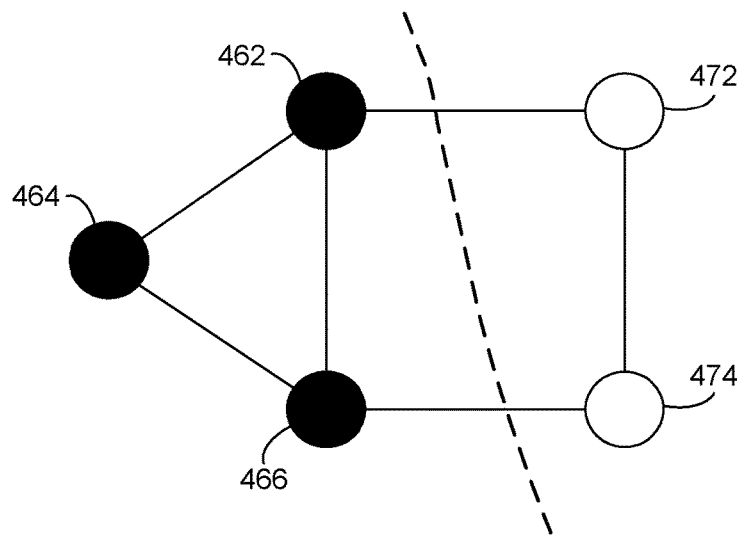
FIG. 4B shows electronic devices grouped into clusters based on directional profiles.

FIG. 4B shows electronic devices grouped into clusters based on directional profiles. The electronic devices are represented by nodes 462, 464, 466, 472, 474. The electronic devices may have generated the directional profiles based on dimensionality reduction such as principal component analysis (PCA) on three dimensional measurements outputted by the accelerometer and/or IMU. The nodes 462, 464, 466, 472, 474 can represent the directional profiles.

In the example shown in FIG. 4B, the nodes 462, 464, 466, representing three electronic devices, are grouped into a primary cluster. The primary cluster is the cluster with the greatest number of nodes, in this example three. One or more of the electronic devices can determine, based on the nodes 462, 464, 466 being grouped into the primary cluster, that the three electronic devices represented by the nodes 464, 464, 466 have corresponding directional profiles.

In the example shown in FIG. 4B, the nodes 472, 474, representing two electronic devices, are not grouped into the primary cluster. One or more of the electronic devices can determine, based on the nodes 462, 464, 466 not being grouped into the primary cluster, that the three electronic devices represented by the nodes 464, 464, 466 do not have corresponding directional profiles with any of the other electronic devices.

Based on the three electronic devices represented by the nodes 464, 464, 466 having corresponding directional profiles, the electronic devices represented by the nodes 464, 464, 466 can share a state. One of the electronic devices represented by the nodes 464, 464, 466 can, for example, send state information to the one or more of the other two devices, and one or more of the other two electronic devices can, after receiving the state information update their state, such as the state of their browser, based on the received state information. The updating of the state can enable the electronic devices to synchronize content, such as browser content. The synchronizing content enables a user to switch devices without loss of continuity of experience within multiple instances of an application.

Figure 5A:
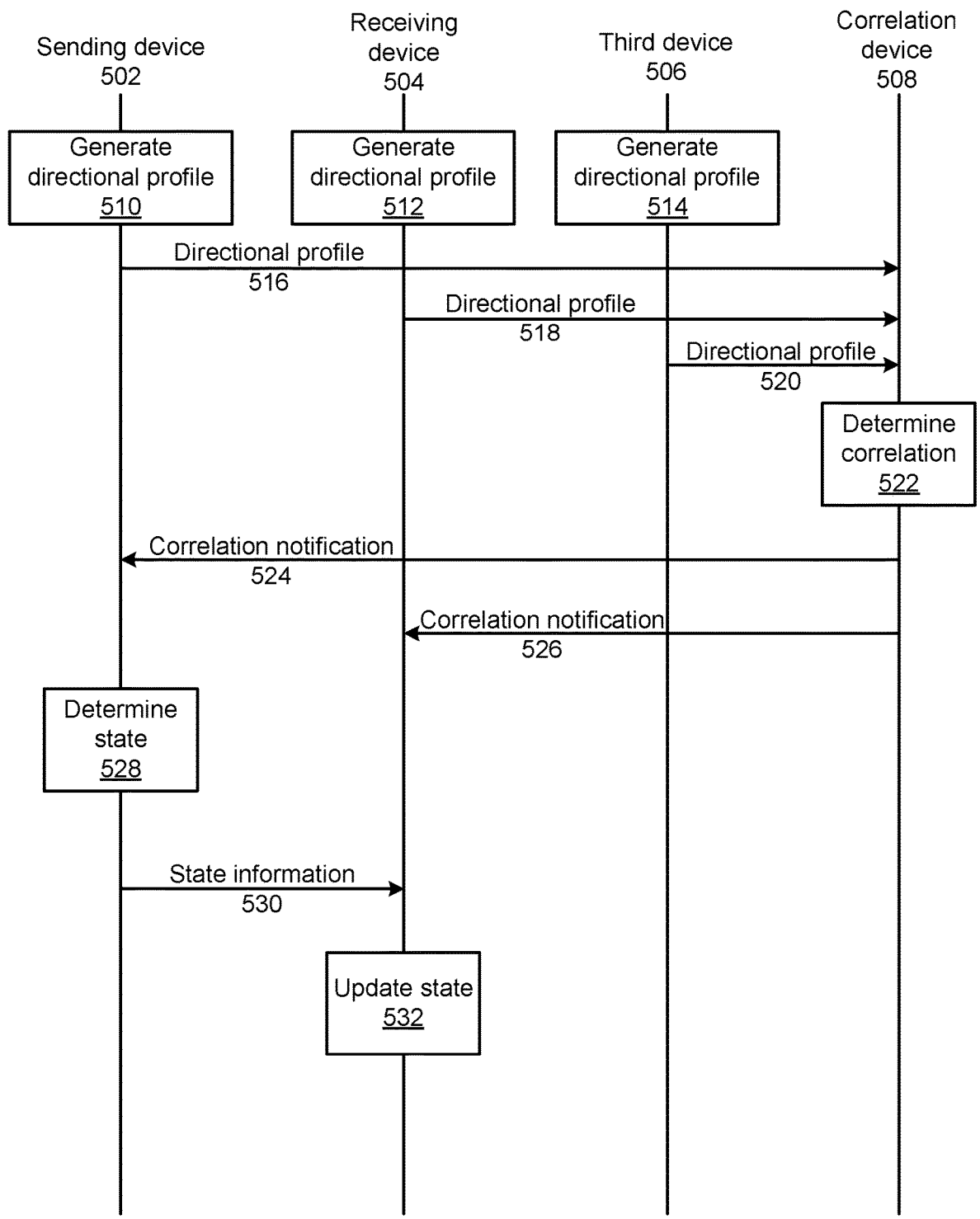
FIG. 5A is a timing diagram showing processes performed, and messages exchanged, by electronic devices according to an example.

FIG. 5A is a timing diagram showing processes performed, and messages exchanged, by electronic devices 502, 504, 506, 508 according to an example. In this example, a correlation device 508 can be remote from other electronic devices 502, 504, 506, and can determine whether a correlation of directional profiles exists between the other electronic devices 502, 504, 506. A sending device 502, a receiving device 504, and a third device 506 can include any combination of features and/or functionalities of the electronic devices 102, 104, 106, 302, 306 described above. The sending device 502 may be selected due to having been accessed by a user more recently than the receiving device 504, causing the sending device 502 to have state information to be transferred to the receiving device 504.

The electronic devices 502, 504, 506 can generate their respective directional profiles (510, 512, 514). The electronic devices 502, 504, 506 can generate their respective directional profiles (510, 512, 514) by, for example, measuring their respective acceleration and determining a principal component of their respective accelerometer readings, as described above. The electronic devices 502, 504, 506 can send their respective directional profiles 516, 518, 520 to the correlation device 508. The electronic devices 502, 504, 506 can send their respective directional profiles 516, 518, 520 to the correlation device 508 via, for example, the Internet, a Wireless Fidelity ("WiFi") Institute for Electrical and Electronics Engineers (IEEE) 802.11 interface, and/or a Bluetooth interface, as non-limiting examples.

After receiving the directional profiles 516, 518, 520 from the electronic devices 502, 504, 506, the correlation device 508 can determine whether a correlation event has occurred (522). A correlation event can indicate that two electronic devices 502, 504, 506 are moving together, such as being carried by a same user, or carried by users who are moving (such as walking) together along a similar path or in a same vehicle. The correlation device 508 can determine whether a correlation event has occurred between two or more electronic devices 502, 504, 506 based on IMU data and/or accelerometer data received from two or more electronic devices 502, 504, 506 indicating that a movement similarity condition has been met. The similarity condition can include inertial movements of the electronic devices 502, 504, 506 for which the correlation event has occurred satisfying a similarity threshold, and/or the electronic devices 502, 504, 506 for which the correlation event has occurred being included in a same cluster based on IMU data and/or accelerometer data received from two or more electronic devices 502, 504, 506.

Figure 5B:
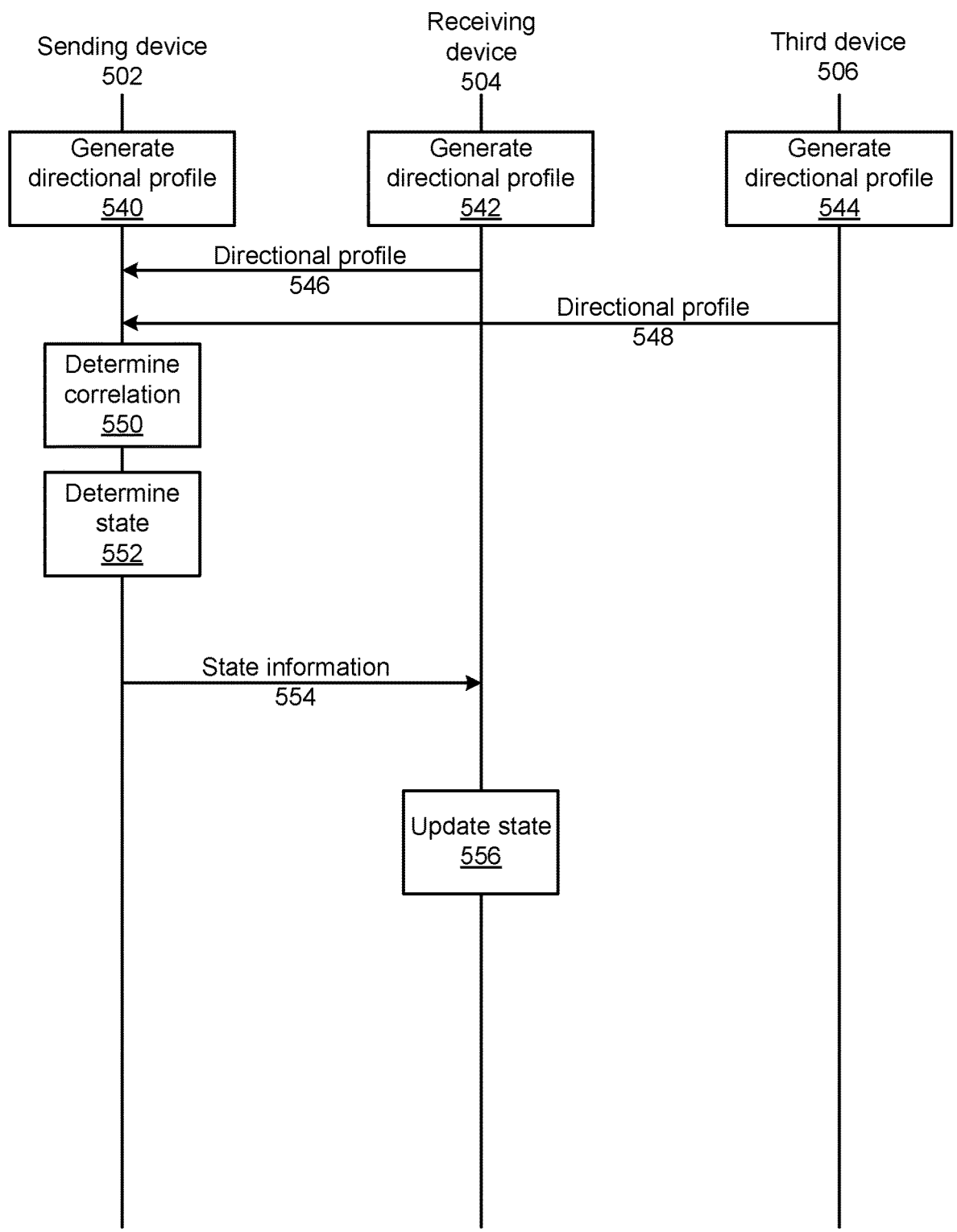
FIG. 5B is a timing diagram showing processes performed, and messages exchanged, by electronic devices according to another example.
Figure 5C:
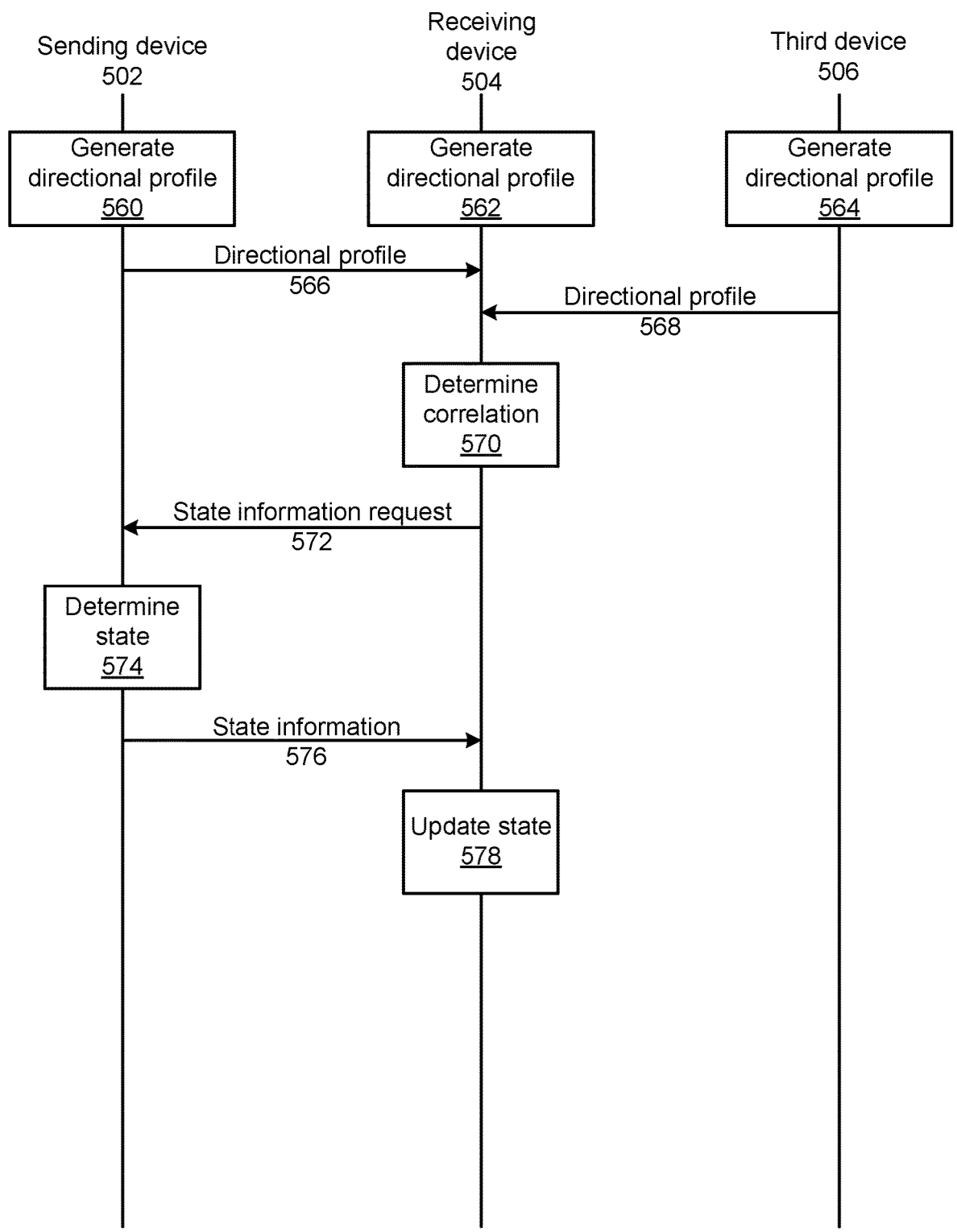
FIG. 5C is a timing diagram showing processes performed, and messages exchanged, by electronic devices according to another example.

In some examples, the correlation device 508 can determine whether the correlation event has occurred (522) based on, for example, performing a clustering function and/or cluster analysis on the directional profiles 516, 518, 520 (which can represent accelerometer-tracked movements of the electronic devices 502, 504, 506). The correlation device 508 can determine that two or more of the electronic devices 502, 504, 506 such as the sending device 502 and the receiving device 504, are included in a same cluster and/or a primary cluster. In this example, the sending device 502 and receiving device 504 are included in the same cluster and/or primary cluster and have corresponding directional profiles, and the third device 506 is not included in the same cluster and/or primary cluster and does have a corresponding directional profile with either the sending device 502 or the receiving device 504. While one third device 506 that is not included in the same cluster and/or primary cluster and does have a corresponding directional profile with either the sending device 502 or the receiving device 504 is shown in FIGS. 5A, 5B, and 5C, any number of devices that are not included in the same cluster and/or primary cluster and do not have a corresponding directional profile with either the sending device 502 or the receiving device 504 can be associated with a same user and/or be included in a same group as the sending device 502 and receiving device 504.

The inclusion of the two or more electronic devices 502, 504 in the same cluster and/or primary cluster can indicate that the electronic devices 502, 504 that are included in the same cluster and/or primary cluster having corresponding directional profiles. Based on the inclusion of the two or more electronic devices 502, 504 in the same cluster and/or primary cluster, the correlation device 508 can determine that the electronic devices 502, 504 that are included in the same cluster and/or primary cluster have corresponding directional profiles. Based on determining that the electronic devices 502, 504 have corresponding directional profiles, the correlation device 508 can determine that a correlation event has occurred between the electronic devices 502, 504 that have corresponding directional profiles.

In some examples, the directional profiles of the electronic devices 502, 504, 506 can be considered to correspond and/or match (correlate) if their inertial movement as functions of time satisfy a similarity threshold. The similarity threshold can be based on cumulative differences in inertial movement values (or principal components, and can require a sum of differences between inertial movement values (or principal components) at each point in time to be at or below a difference threshold, or a sum of squared differences between inertial movement values (or principal components) at each point in time to be at or below a squared difference threshold, or the sum of differences or sum of squared differences to be at or below a predetermined fraction of an average of the inertial movement values, as non-limiting examples. In some examples, one or more of the electronic devices 502, 504, 506 can shift the time values to find a maximum fit or maximum match, to account for differences in time measurements between the electronic devices 502, 504, 506.

Responsive to the determination that the correlation event has occurred (522), the correlation device 508 can send correlation notifications 524, 526 to the electronic devices 502, 504 that have corresponding directional profiles. One of the electronic devices 502, 504 that received the correlation notification 524, 526 can be considered a sending device 502 based on an application executing on the sending device 502 having recently received input and/or interaction from a user, such as one of the users 100, 300, and/or the likelihood of the sending device 502 sending state information to the other electronic device 504. One of the other electronic devices 502, 504 that received the correlation notification 524, 526 can be considered a receiving device 504 based on an application executing on the receiving device 504 having less recently received input and/or interaction from the user, and/or the likelihood of the receiving device 504 receiving state information from the sending device 502. The correlation notification can identify the electronic devices 502, 504 that have corresponding directional profiles.

In response to receiving the correlation notification 524 indicating the occurrence of a correlation event in an example in which the sending device 502 is the sending device 502 (rather than a receiving device), the sending device 502 can determine a state (528) of the sending device 502. The sending device 502 can determine, for example, a state of an application executing on the sending device 502. The sending device 502 can determine, for example, a state of a browser on the sending device 502, such as a webpage open on the browser and/or associated Universal Resource Locator (URL), and/or a location on the page that the user is viewing. The sending device 502 can determine, for example, a state of a game executing on the sending device 502. The sending device 502 can send the determined state information to the receiving device 504.

In response to receiving the state information 530, the receiving device 504 can update a state (532) of the receiving device 504. The receiving device 504 can update the state (532) of the receiving device 504, based on the state information 530 receiving from the sending device 502, to match the state of the sending device 502 when the sending device determined the state (528) of the sending device 502. The receiving device 504 can update the state (532) by updating a state of a browser or game executing on the receiving device 504, as non-limiting examples. For example, updating the state (532) can include opening an application that corresponds to an application identifier (e.g., operating system intent, deep link) and navigating to an interface within the interface that corresponds to a content identifier in the state information.

FIG. 5B is a timing diagram showing processes performed, and messages exchanged, by electronic devices 502, 504, 506 according to another example. In this example, the sending device 502 can determine whether a correlation of directional profiles exists between the electronic devices 502, 504, 506.

The electronic devices 502, 504, 506 can generate their respective directional profiles 540, 542, 544. The electronic devices 502, 504, 506 can generate their respective directional profiles 540, 542, 544 in a similar manner to (510), (512), (514) described above. The electronic devices 504, 506 other than the sending device 502 can send their respective directional profiles 546, 548 to the sending device 502.

In response to receiving the directional profiles 546, 548, and based on the directional profile generated by the sending device 502, the sending device 502 can determine whether a correlation event occurred (550). The sending device 502 can determine whether the correlation event occurred (550) in a similar manner to (522) described above. In this example, the sending device 502 determines that the sending device 502 and the receiving device 504 are correlated and/or have corresponding and/or corresponding directional profiles.

Based on determining that a correlation event occurred and that the sending device 502 has a corresponding directional profile with the receiving device 504, the sending device 502 can determine the state (552) of the sending device 502. The sending device 502 can determine the state (552) of the sending device 502 in a similar manner to (528) described above. The sending device 502 can send the determined state information 554 to the receiving device 504. The receiving device 504 can receive the state information 554, and respond to receiving the state information 554 by updating a state (556) of the receiving device 504. The receiving device 504 can update the state (556) of the receiving device 504 in a similar manner to (532) described above.

FIG. 5C is a timing diagram showing processes performed, and messages exchanged, by electronic devices 502, 504, 506 according to another example. In this example, the receiving device 504 can determine whether a correlation of directional profiles exists between the electronic devices 502, 504, 506.

The electronic devices 502, 504, 506 can generate respective directional profiles (560), (562), (564). The electronic devices 502, 504, 506 can generate their respective directional profiles (560), (562), (564) in a similar manner to (510), (512), (514) and/or (540), (542), (544) described above. The devices 502, 506 can send their respective directional profiles 566, 568 to the receiving device 504, and the receiving device 504 can receive the directional profiles.

In response to receiving the directional profiles 566, 568, the receiving device 504 can determine a correlation event (570). The receiving device 504 can determine the correlation event (570) in a similar manner to (522), (550) described above.

In this example, the electronic devices 502, 506 can send their respective directional profiles 566, 568 to the electronic device 504 that will become the receiving device 504. The receiving device 504 can receive the directional profiles 566, 568. In response to receiving the directional profiles 566, 568, the receiving device 504 can determine the correlation event (570). The receiving device 504 can determine the correlation event (570) in a similar manner to (522) and/or (550) described above. The receiving device 504 can determine that the correlation event (570) indicates that the receiving device 504 and sending device 502 have corresponding directional profiles. The receiving device 504 and/or sending device 502 can determine that the state of the receiving device 504 should be updated to the state of the sending device 502 based on the user 100, 300 having more recently interacted with an application executing on the sending device 502 than the receiving device 504, for example.

Based on determining the correlation event 570 (such as that the sending device 502 and receiving device 504 have corresponding directional profiles based on the occurrence of a correlation event) and that the state of the receiving device 504 should be updated to the state of the sending device 502, the receiving device 504 can send a state information request 572 to the sending device 502, and the sending device 502 can receive the state information request 572.

The sending device can respond to the state information request 572 by determining a state (574) of the sending device 502. The sending device 502 can determine the state in a similar manner to (528), (552). Based on the determined state, the sending device 502 can send a state information message 576 to the receiving device 504, and the receiving device 504 can receive the state information message 576 from the sending device 502. The state information message 576 can include the determined state of the sending device 502. In response to receiving the state information message 576, the receiving device 504 can update a state of the receiving device (578). The receiving device 504 can update the state of the receiving device (578) in a similar manner to (532), (556).

Figure 6:
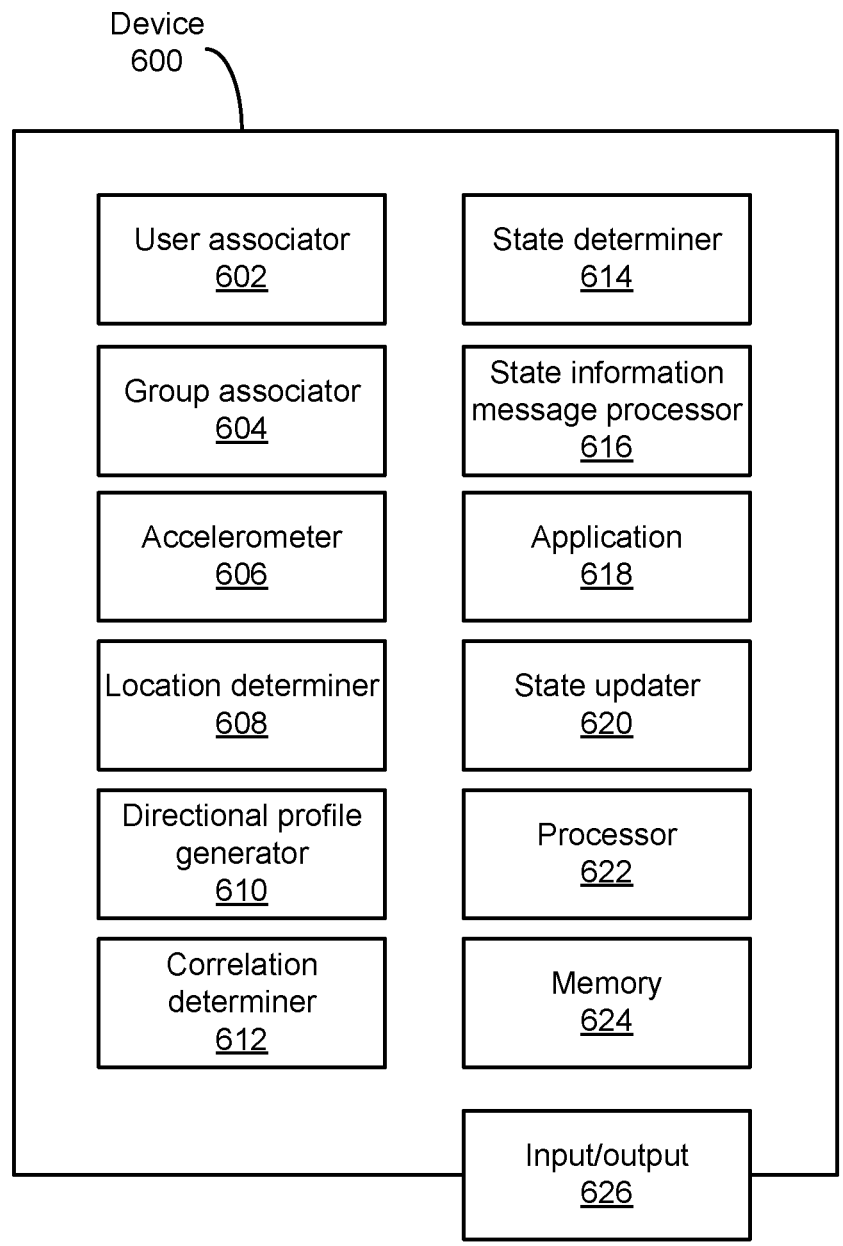
FIG. 6 is a block diagram showing an electronic device according to an example.

FIG. 6 is a block diagram showing an electronic device 600 according to an example. The electronic device 600 can be an example of any of the electronic devices 102, 104, 106, 302, 306, 502, 504, 506, 508 described above. The electronic device 600 can include any combination of features and/or functionalities of any of the electronic devices 102, 104, 106, 302, 306, 502, 504, 506, 508 described above.

The electronic device 600 can include a user associator 602. The user associator 602 can associate the electronic device 600 with a user and/or account, determine whether the electronic device is associated with a particular user and/or account, and/or determine whether the electronic device 600 is associated with a same user and/or account as another electronic device.

The electronic device 600 can include a group associator 604. The group associator 604 can associate the electronic device 600, and/or a user and/or account associated with the electronic device 600, with a group. The group associator 604 can determine whether the electronic device 600, and/or a user and/or account associated with the electronic device 600, is included in and/or associated with a same group as another electronic device and/or a user or account associated with the other electronic device in the group.

The electronic device 600 can include an accelerometer 606 and/or inertial measurement unit (IMU). The accelerometer 606 and/or IMU can measure and report acceleration, specific force, angular rate, and/or orientation of the electronic device 600.

The electronic device 600 can include a location determiner 608. The location determiner 608 can determine a geographic location of the electronic device 600. The location determiner 608 can determine a geographic location of the electronic device 600 based, or example, on global positioning system (GPS) signals received from satellites, signals received from Wireless Fidelity 802.11 hotspots with known locations, or based on signals received from cellular base stations with known locations, as non-limiting examples.

The electronic device 600 can include a directional profile generator 610. The directional profile generator 610 can generate a directional profile for the electronic device 600. The directional profile generator 610 can generate the directional profile based on acceleration data, specific force data, angular rate data, and/or orientation data measured by the accelerometer 606 and/or IMU.

The directional profile generator 610 can generate the directional profile by, for example, performing dimensionality reduction such as principal component analysis (PCA) on any combination of the acceleration data, specific force data, angular rate data, and/or orientation data. In some examples, the directional profile generator 610 can generate the directional profile by performing dimensionality reduction on the three dimensional measurements outputted by an accelerometer 606 and/or IMU.

In some examples, the directional profile generator 610 can buffer and/or store a predetermined time period of acceleration and/or motion data measured by the accelerometer 606, such as two seconds of acceleration and/or motion data. In some examples, the directional profile generator 610 can transform the inertial movement data, such as the principal component of the accelerometer data and the time values, into a vector. In some examples, the directional profile generator 610 can perform a Fourier transformation on the directional data to eliminate time variances between the electronic devices. In some examples, the directional profile generator 610 can save an amplitude phase tuple for a frequency with a highest amplitude. Concatenation over all channels in a three-axis accelerometer can generate a six-dimensional code vector.

The electronic device 600 can include a correlation determiner 612. The correlation determiner 612 can determine whether a correlation event has occurred, and/or detect the occurrence of a correlation event. In some examples, the correlation determiner 612 can determine whether a correlation event has occurred between two or more devices that are associated with the same user and/or account. In some examples, the correlation determiner 612 can determine whether a correlation event has occurred between two or more devices that are associated with users and/or accounts that are included in a same group. A correlation event can indicate that two or more devices have corresponding directional profiles. Corresponding directional profiles can indicate that movements tracked by accelerometers and/or IMUs of two or more electronic devices are in same directions and proximal locations, such as a single user carrying the two or more electronic devices, multiple users walking together and carrying their respective electronic devices, or multiple users riding in a vehicle together with their respective electronic devices, as non-limiting examples. In some implementations, determining a correlation event may include identifying a certain movement pattern in each of the devices' directional profiles, for which a correlation is suspected. For example, if two or more devices are positioned close to each other and/or have corresponding orientations, then a trigger event may be determined only if the movement pattern of each device indicates a specific pattern, for example, shaking. The direction of the shaking may provide an indication for the direction of a state transfer between the devices.

In some examples, the correlation determiner 612 can perform clustering analysis, and/or a clustering function, on the directional profiles and/or accelerometer tracked movements of multiple electronic devices. In some examples, the multiple electronic devices can be associated with the same user and/or account. In some examples, the multiple electronic devices can be associated with users and/or accounts that are included in a same group.

In some examples, the clustering function can include k-means clustering. In some examples, the correlation determiner 612 can determine the value of k, or the number of clusters, by the elbow method. The correlation determiner 612 can determine that electronic devices that are in a same cluster, and/or are in a primary cluster, having corresponding directional profiles. The primary cluster can be a cluster that has the most and/or highest number of electronic devices. The electronic devices that are included in the primary cluster can be considered to have corresponding directional profiles with each other. The electronic devices that are not included in the primary cluster can be considered to not have corresponding directional profiles with each other or any other electronic devices.

In some examples, the directional profile generator 610 can generate a directional profile, and/or the correlation determiner 612 can determine whether a correlation event occurred, in response to interactions with a first electronic device and/or a second electronic device. Interactions with the first electronic device can include a user reducing power consumed by a component and/or by powering down a component of the first electronic device, such as a display included in the first electronic device. Interactions with the second electronic device can include a user initiating interaction with a second electronic device after interacting with a first electronic device, such as turning on a display included in the second electronic device, activating a power button of or otherwise powering on the second electronic device, and/or waking up or bringing the display included in the second electronic device into a higher power state. The generation of the directional profile and/or determination of whether the correlation event occurred in response to the user initiating interaction with the second electronic device can save battery power by performing these tasks in response to a possible need for synchronizing content. In some examples, the second electronic device can send a message to one or more other electronic devices indicating that the second electronic device is interacting with the user, prompting the one or more other electronic devices to generate their respective directional profiles and/or determine whether a correlation event has occurred.

In some examples, the correlation determiner 612 can determine that a correlation event has occurred based on IMU data and/or accelerometer data indicating that two or more electronic devices moved in same directions, rather than in opposite directions (which could indicate that the electronic devices collided or "bumped" into each other, which would not be considered a correlation event). In some examples, IMU data and/or accelerometer data indicating an elastic collision between electronic devices can indicate that a correlation event has not occurred. In some examples, the correlation determiner 612 can determine that a correlation event has occurred based on IMU data and/or accelerometer data indicating that two or more electronic devices have met a movement similarity condition for at least a threshold duration of time, such as at least two seconds, at least five seconds, at least ten seconds, at least one minute, at least five minutes, or at least ten minutes, as non-limiting examples.

One or more of the electronic devices 102, 104, 106, 302, 306, 502, 504, 506, 508 can be selected as the electronic device that determines whether a correlation event occurs, and/or performs the functions of the correlation determiner 612. In some examples, the electronic device can be selected as the correlation device based on user input and/or a user setting. In some examples, the electronic device can be selected as the correlation device based on administrator settings, such as a setting included in a server such as the remote correlation device 508.

The electronic device 600 can include a state determiner 614. The state determiner 614 can determine a state of the electronic device 600, state information, and/or a state of an application executing on the electronic device 600. The state information is data that enables the receiving device to navigate to specific content, e.g., via a deep link, an operating system intent, a resource locator, and the like. Thus, the state information can include an application state, including information related to the application that is stored in memory of the electronic device, a resource state including resources such as files, images, and/or database records stored in association with the application, and/or a session state that maintains a status of communication between the electronic device 600 and a server. In an example in which the application is a browser, the state information that the state determiner 614 determines can include a webpage or universal resource locator (URL) and a browser intent or a deeplink. In some examples in which the application is a browser, the state information can include the webpage or URL and a location on a webpage that the user is viewing. In an example in which the application is a game, the state information can include a state of the game, such as locations of objects, values of attributes of objects, and/or identities of players.

The electronic device 600 can include a state information message processor 616. When the electronic device 600 is the sending device 502, the state information processor 616 can generate and send a state information message to the receiving device 504. The state information message can include the state information determined by the state determiner 614. When the electronic device 600 is the receiving device 504, the state information processor 616 can receive and process the state information message sent by the sending device 502.

The electronic device 600 can include one or more applications 618. The applications 618 can execute on the electronic device 600. The applications 618 can include web browsers, games, or productivity applications, as non-limiting examples.

The electronic device 600 can include a state updater 620. The state updater 620 can update the state of the application 618 in response to receiving the state information message. The state updater 620 can, for example, update a state of a browser executing on the electronic device 600 by instructing the browser to request a particular webpage and/or scroll to a particular location on the webpage. The state updater 620 can, for example, update a state of a game executing on the electronic device by launching the game and/or changing locations and/or value of objects included in the game.

The electronic device 600 can include at least one processor 622. The at least one processor 622 can execute instructions, such as instructions stored in at least one memory device 624, to cause the electronic device 600 to perform any combination of methods, functions, and/or techniques described herein.

The electronic device 600 can include at least one memory device 624. The at least one memory device 624 can include a non-transitory computer-readable storage medium. The at least one memory device 624 can store data and instructions thereon that, when executed by at least one processor, such as the processor 622, are configured to cause the electronic device 600 to perform any combination of methods, functions, and/or techniques described herein. Accordingly, in any of the implementations described herein (even if not explicitly noted in connection with a particular implementation), software (e.g., processing modules, stored instructions) and/or hardware (e.g., processor, memory devices, etc.) associated with, or included in, the electronic device 102 can be configured to performed alone, or in combination with any of the electronic devices 102, 104, 106, 302, 306, 502, 504, 506, 508, any combination of methods, functions, and/or techniques described herein.

The electronic device 600 can include at least one input/output node 626. The at least one input/output node 626 may receive and/or send data, such as from and/or to, the electronic device 600, and/or may receive input and provide output from and to a user. The input and output functions may be combined into a single node, or may be divided into separate input and output nodes. The input/output node 626 can include any wired or wireless interfaces (such as Bluetooth, Institute for Electrical and Electronics Engineers 802.11, or a cellular communication interface) for communicating with other electronic devices. The input/output node 626 can communicate with other electronic devices 102, 104, 106, 302, 306, 502, 504, 506, 508, such as sending any of the messages 516, 518, 520, 524, 526, 530, 546, 548, 554, 566, 568, 572, 576 (which can include directional profiles 516, 518, 520, 546, 548, 566, 568, correlation notifications 524, 526, state information 554, 576, and/or state information requests 572), via Internet Protocol via cellular base stations and intervening servers, via 802.11 communication protocols, and/or via peer-to-peer communication protocols such as Bluetooth.

In some implementations, the correlation event can be used in other workflows. As an example, the detection of a correlation event can be used in a process for suggesting content, an application to open, or some other action to the user, with user permission. More specifically, by way of example, a user may go jogging between 6 am and 7 am on a regular basis and listen to a playlist using earbuds and a phone. Implementations can use corresponding directional profiles for the phone and the earbuds to boost a confidence prediction that the user will open the playlist application if the time of day falls within (or close to) the learned window of 6 am to 7 am. Thus, in some implementations the correlation event may be used to trigger events other than or in addition to the state transfer.

Figure 7:
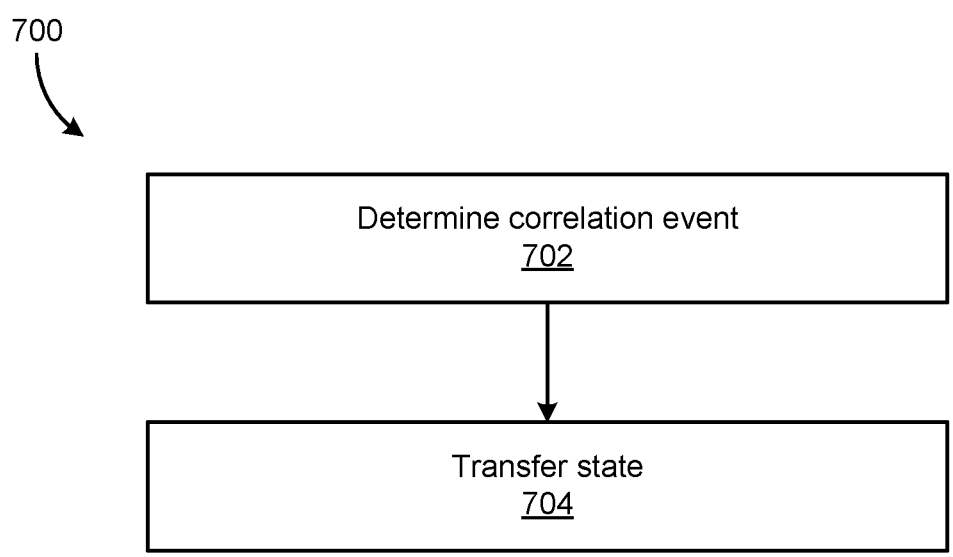
FIG. 7 is a flowchart showing a method according to an example.

FIG. 7 is a flowchart showing a method 700 according to an example. The method can include determining, by a correlation device, that a correlation event has occurred based on at least a first device and a second device having corresponding directional profiles (702). The method 700 can include, responsive to occurrence of the correlation event, causing the first device to transfer a state of the first device by sending a state information message to the second device (704).

In some examples, determining that the correlation event has occurred (702) can include performing a clustering function on accelerometer-tracked movements of the first device and the second device, and determining that an output of the clustering function indicates that the first device and the second device are included in a same cluster, wherein devices in the same cluster have corresponding directional profiles.

In some examples, the corresponding directional profiles can indicate that movements tracked by an accelerometer of the first device and movements tracked by an accelerometer of the second device satisfied a movement similarity condition for at least a threshold duration of time.

In some examples, the first device can be associated with a first user, the second device can be associated with a second user, and the first user and the second user can be included in a same group.

In some examples, the state information message can include a state of a game associated with the same group.

In some examples, the corresponding directional profiles can indicate that movements tracked by an accelerometer of the first device and movements tracked by an accelerometer of the second device indicated same modes of transportation.

In some examples, the first device and the second device can be associated with a same user.

In some examples, the correlation device can be remote from the first device and the second device.

In some examples, the correlation device can be the first device.

In some examples, the first device can send the state information message based on the first device being accessed by a user more recently than the second device.

Figure 8:
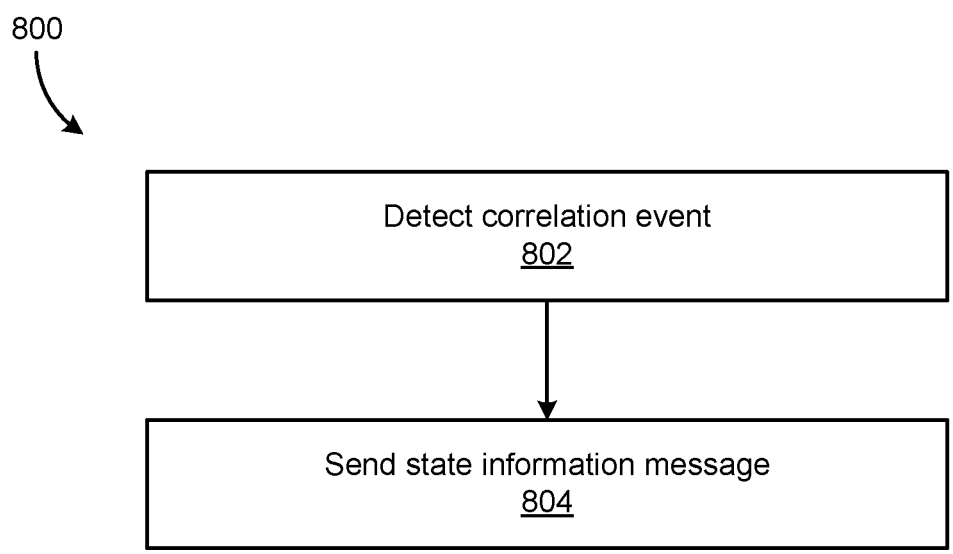
FIG. 8 is a flowchart showing a method according to another example.

FIG. 8 is a flowchart showing a method 800 according to another example. The method 800 can be performed by a sending device, such as the sending device 502. The method 800 can include detecting a correlation event based on a directional profile of the sending device corresponding to a directional profile of a receiving device (802). The method 800 can include, responsive to detecting the correlation event, sending a state information message from the sending device to the receiving device, the state information message including state information about at least one application executing on the sending device (804).

In some examples, detecting the correlation event can include performing a clustering function on accelerometer-tracked movements of the sending device and the receiving device, and determining that an output of the clustering function indicates that the sending device and the receiving device are included in a same cluster, wherein devices in the same cluster have corresponding directional profiles.

In some examples, the sending device and the receiving device can be associated with a same user.

In some examples, the sending device can be associated with a first user, the receiving device can be associated with a second user, and the first user and the second user can be included in a same group.

In some examples, the method 800 can further include the sending device sending the state information message from the sending device to the receiving device subsequent to detecting the correlation event and responsive to receiving an instruction to power down a component of the sending device.

Figure 9:
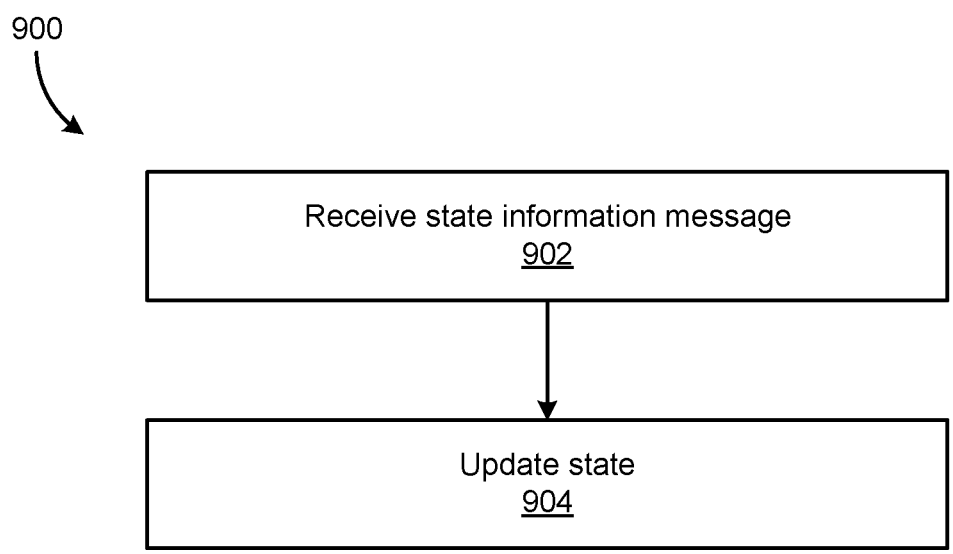
FIG. 9 is a flowchart showing a method according to another example.

FIG. 9 is a flowchart showing a method 900 according to another example. The method 900 can be performed by a receiving device, such as the receiving device 504. The method 900 can include receiving a state information message from a sending device, the state information message being sent in response to detection of a correlation event, the correlation event being based on the receiving device and the sending device having corresponding directional profiles (902). The method 900 can include, based on the state information message, updating a state of at least one application executing on the receiving device (904).

In some examples, the sending device and the receiving device can be associated with a same user.

In some examples, the sending device can be associated with a first user, the receiving device can be associated with a second user, and the first user and the second user can be included in a same group.

In some examples, the receiving device can detect the correlation event and the method can further include, responsive to detecting the correlation event, sending, to the sending device, a state information request, and receiving the state information message as a response to the state information request.

In some examples, the receiving device can detect the correlation event and the method can further include, responsive to powering on a component of the receiving device, sending, to the sending device, a state information request, and receiving the state information message as a response to the state information request.

Figure 10:
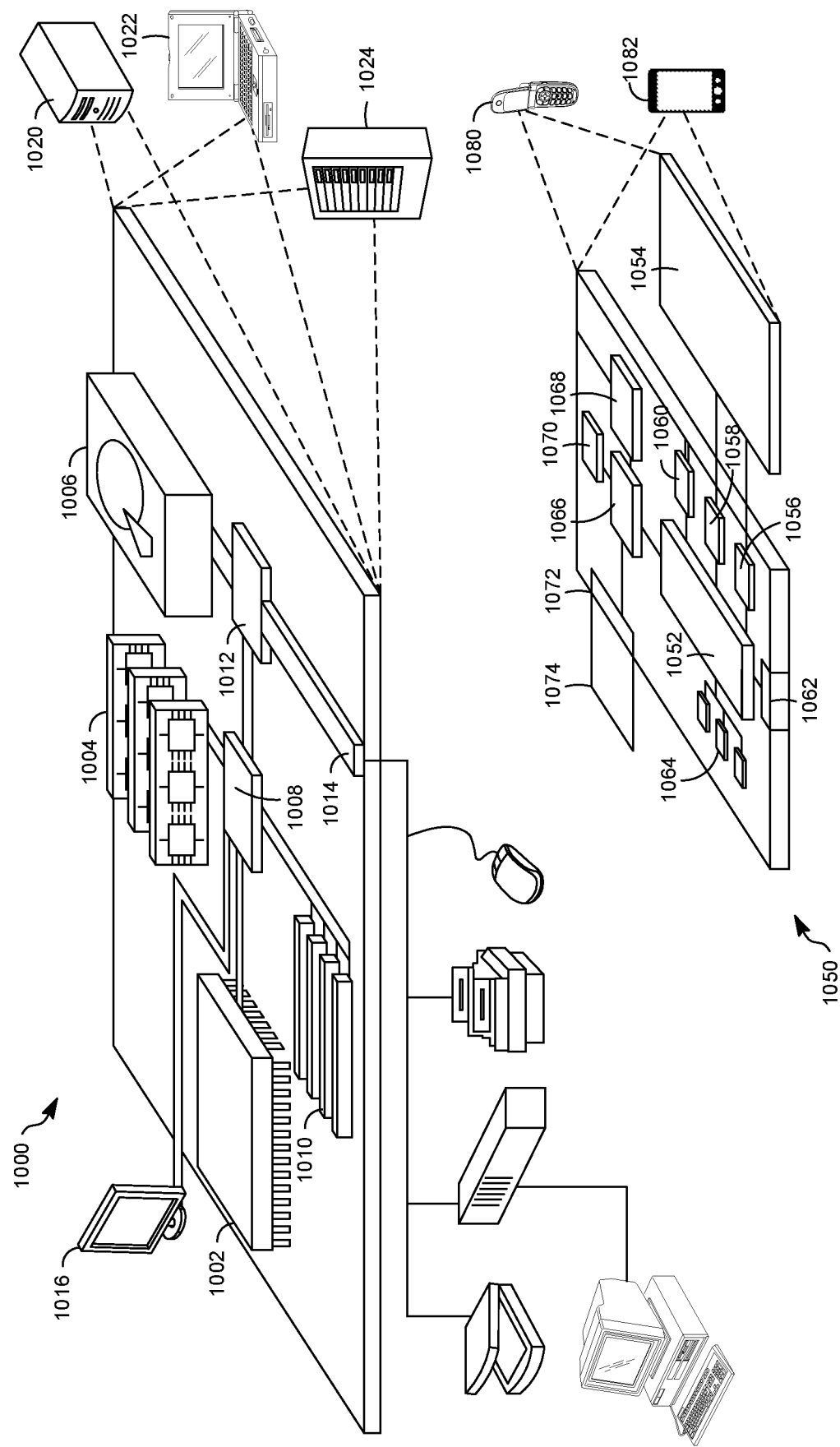
FIG. 10 shows an example of a computer device and a mobile computer device that can be used to implement the techniques described here.

FIG. 10 shows an example of a generic computer device 1000 and a generic mobile computer device 1050, which may be used with the techniques described here. Computing device 1000 is intended to represent various forms of digital computers, such as laptops, desktops, tablets, workstations, personal digital assistants, televisions, servers, blade servers, mainframes, and other appropriate computing devices. Computing device 1050 is intended to represent various forms of mobile devices, such as personal digital assistants, cellular telephones, smart phones, and other similar computing devices. The components shown here, their connections and relationships, and their functions, are meant to be examples only, and are not meant to limit implementations described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. The processor 1002 can be a semiconductor-based processor. The memory 1004 can be a semiconductor-based memory. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is an example only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provided in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provided as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smart phone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   determining, by a correlation device, that a correlation event has occurred based on at least a first device and a second device having corresponding directional profiles, the corresponding directional profiles being based on movements tracked by an accelerometer of the first device and movements tracked by an accelerometer of the second device; and
   responsive to occurrence of the correlation event, causing the first device to transfer a state of the first device by sending a state information message to the second device.

2. The method of claim 1, wherein determining that the correlation event has occurred includes:
   performing a clustering function on the movements tracked by the accelerometer of the first device and the movements tracked by the accelerometer of the second device; and
   determining that an output of the clustering function indicates that the first device and the second device are included in a same cluster, wherein devices in the same cluster have corresponding directional profiles.

3. The method of claim 1, wherein the corresponding directional profiles indicate that the movements tracked by the accelerometer of the first device and the movements tracked by the accelerometer of the second device satisfied a movement similarity condition for at least a threshold duration of time.

4. The method of claim 1, wherein:
   the first device is associated with a first user;
   the second device is associated with a second user; and
   the first user and the second user are included in a same group.

5. The method of claim 4, wherein the state information message includes a state of a game associated with the same group.

6. The method of claim 1, wherein the corresponding directional profiles indicate same modes of transportation.

7. The method of claim 1, wherein the first device and the second device are associated with a same user.

8. The method of claim 1, wherein the correlation device is remote from the first device and the second device.

9. The method of claim 1, wherein the correlation device is the first device.

10. The method of claim 1, wherein the first device sends the state information message based on the first device being accessed by a user more recently than the second device.

11. A non-transitory computer-readable storage medium comprising instructions stored thereon that, when executed by at least one processor, are configured to cause a sending device to:
   detect a correlation event based on a directional profile of the sending device corresponding to a directional profile of a receiving device, the directional profile of the sending device being based on movements tracked by an accelerometer of the sending device and the directional profile of the receiving device being based on movements tracked by an accelerometer of the receiving device; and
   responsive to detecting the correlation event, send a state information message from the sending device to the receiving device, the state information message including state information about at least one application executing on the sending device.

12. The non-transitory computer-readable storage medium of claim 11, wherein detecting the correlation event includes:
   performing a clustering function on the directional profile of the sending device and the directional profile of the receiving device; and
   determining that an output of the clustering function indicates that the sending device and the receiving device are included in a same cluster, wherein devices in the same cluster have corresponding directional profiles.

13. The non-transitory computer-readable storage medium of claim 11, wherein the sending device and the receiving device are associated with a same user.

14. The non-transitory computer-readable storage medium of claim 11, wherein:
   the sending device is associated with a first user;
   the receiving device is associated with a second user; and
   the first user and the second user are included in a same group.

15. The non-transitory computer-readable storage medium of claim 11, wherein the instructions are configured to cause the sending device to send the state information message from the sending device to the receiving device subsequent to detecting the correlation event and responsive to receiving an instruction to power down a component of the sending device.

16. A receiving device comprising:
   at least one processor; and
   a non-transitory computer-readable storage medium comprising instructions stored thereon that, when executed by the at least one processor, are configured to cause the receiving device to:
      receive a state information message from a sending device, the state information message being sent in response to detection of a correlation event, the correlation event being based on the receiving device and the sending device having corresponding directional profiles, the corresponding directional profiles being based on movements tracked by an accelerometer of the receiving device and movements tracked by an accelerometer of the sending device; and
      based on the state information message, update a state of at least one application executing on the receiving device.

17. The receiving device of claim 16, wherein the sending device and the receiving device are associated with a same user.

18. The receiving device of claim 16, wherein:
   the sending device is associated with a first user;
   the receiving device is associated with a second user; and
   the first user and the second user are included in a same group.

19. The receiving device of claim 16, wherein the receiving device detects the correlation event and the instructions are further configured to cause the receiving device to:
   responsive to detecting the correlation event, send, to the sending device, a state information request; and
   receive the state information message as a response to the state information request.

20. The receiving device of claim 16, wherein the receiving device detects the correlation event and the instructions are further configured to cause the receiving device to:
   responsive to powering on a component of the receiving device, send, to the sending device, a state information request; and receive the state information message as a response to the state information request.

\* \* \* \* \*